No. 672,224. Patented Apr. 16, 1901.
W. S. & C. I. CORBY.
MACHINE FOR WORKING, SHAPING, AND MOLDING DOUGH.
(Application filed May 24, 1900.)
(No Model.) 3 Sheets—Sheet 1.
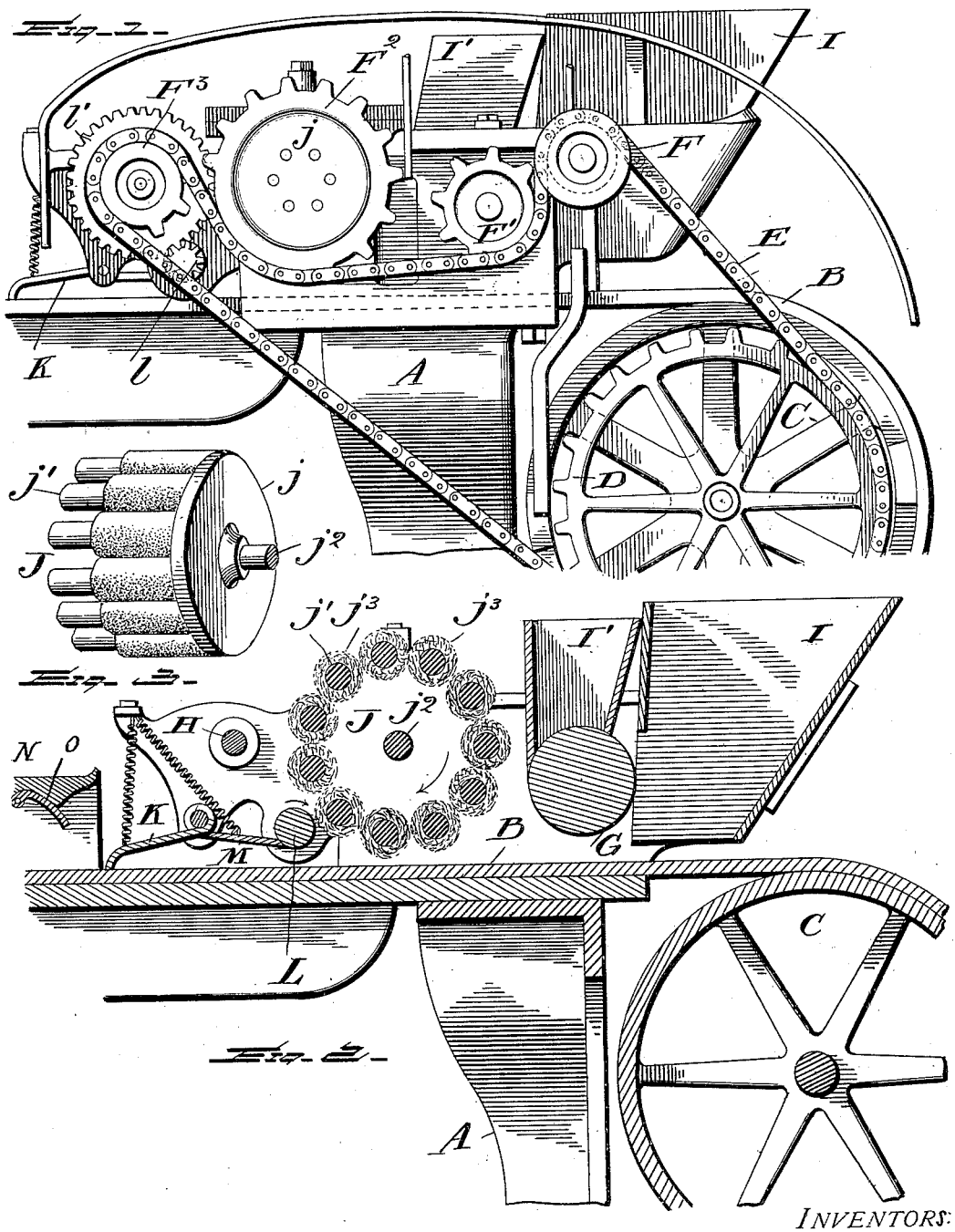
WITNESSES:
INVENTORS:
William S. Corby and
Charles I. Corby.
BY J. S. Barker
their Attorney.

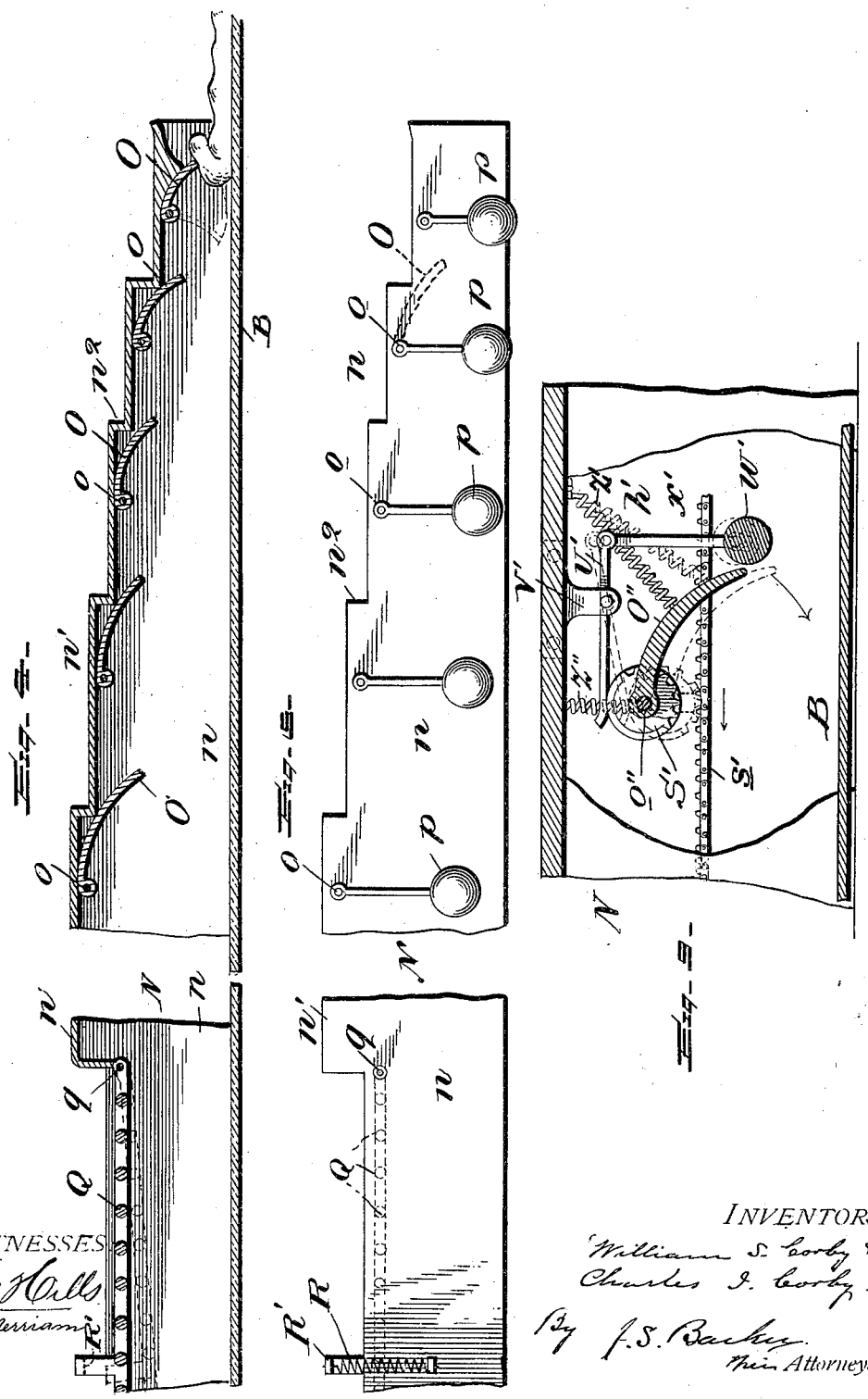

No. 672,224. Patented Apr. 16, 1901.
W. S. & C. I. CORBY.
MACHINE FOR WORKING, SHAPING, AND MOLDING DOUGH.
(Application filed May 24, 1900.)
(No Model.) 3 Sheets—Sheet 3.
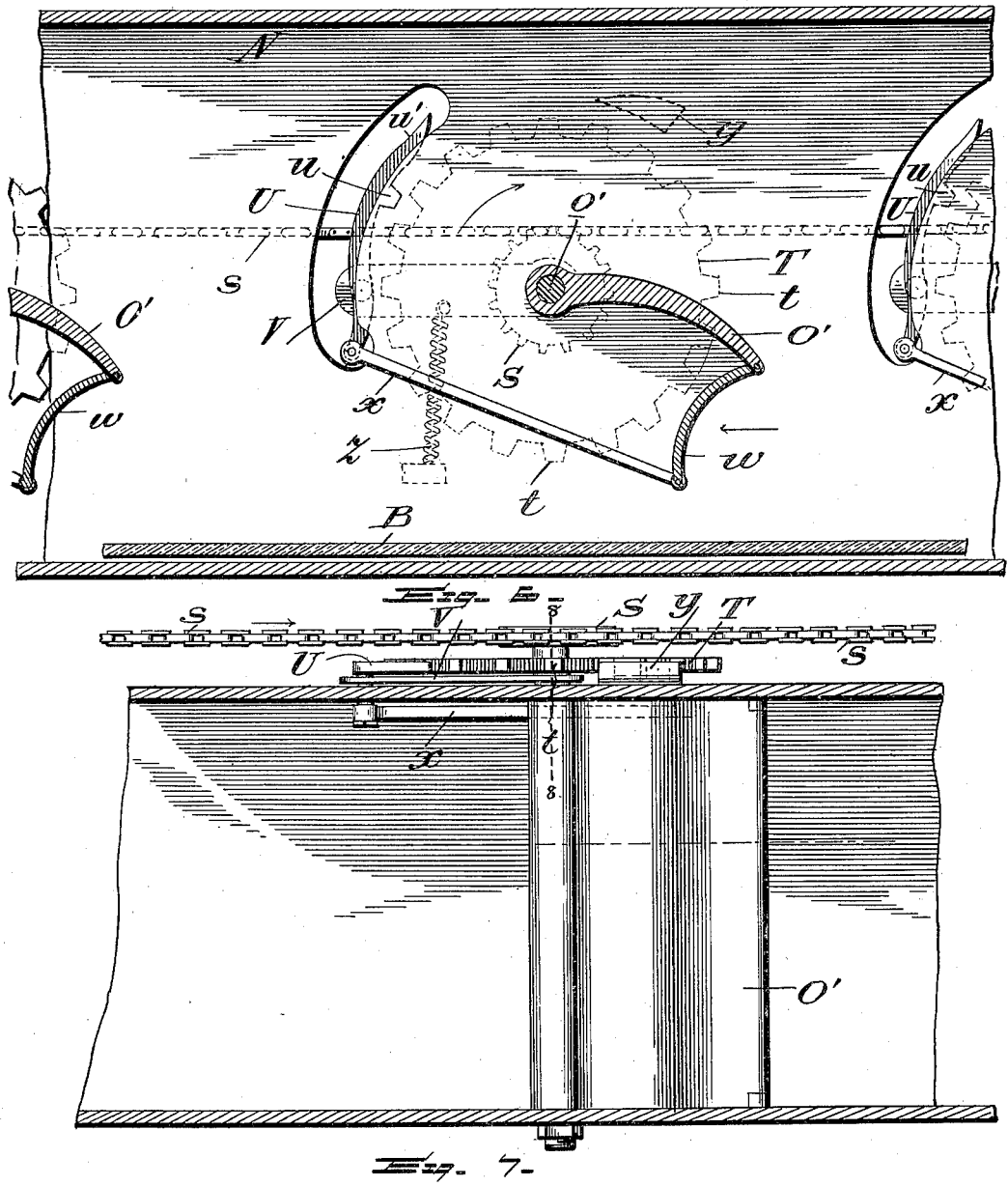
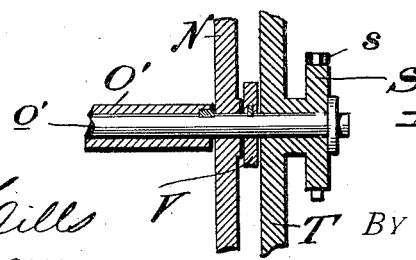
WITNESSES:
INVENTORS:

UNITED STATES PATENT OFFICE.

WILLIAM S. CORBY AND CHARLES I. CORBY, OF WASHINGTON, DISTRICT OF COLUMBIA.

MACHINE FOR WORKING, SHAPING, AND MOLDING DOUGH.

SPECIFICATION forming part of Letters Patent No. 672,224, dated April 16, 1901.

Original application filed October 10, 1898, Serial No. 693,146. Divided and this application filed May 24, 1900. Serial No. 17,852. (No model.)

*To all whom it may concern:*

Be it known that we, WILLIAM S. CORBY and CHARLES I. CORBY, citizens of the United States, residing at Washington, in the District of Columbia, have invented certain new and useful Improvements in Machines for Working, Shaping, and Molding Dough, of which the following is a specification.

Our invention relates to machinery or apparatus for molding dough into loaves of the type illustrated in our Patents No. 590,133, dated September 14, 1897, and No. 611,563, dated September 27, 1898, and has for its object to improve the mechanism for sheeting or flattening out the dough masses before they are delivered to the apparatus which forms them into a loaf shape, and also to improve the part of the apparatus which we have come to term the "pressure-board." The object of both of these improvements is to effect the proper shaping of the loaf with as little working upon the outer surface of the dough mass as possible, as an excessive working of the dough-surface tends to force the gas generated by fermentation out of the surface portion or skin of the dough, with the result that the crust of the baked loaf is harder and tougher than when the loaf is formed without severe working of the surface of the dough loaf.

That portion of the present invention represented in Figures 4 and 5 of the present application is a division of our application Serial No. 693,146, filed October 10, 1898, patented May 15, 1900, No. 649,437.

In the accompanying drawings, wherein our invention is illustrated, Fig. 1 is a side elevation of part of the head or feed end of a dough-molding machine embodying certain of our present improvements. Fig. 2 is a central longitudinal section of the portion of the apparatus illustrated in Fig. 1. Fig. 3 is a perspective view of the device for sheeting or flattening the dough masses before they are molded into loaves, one end of the device being broken away. Fig. 4 is a central longitudinal section of a pressure-board adapted to be used in connection with the parts of the apparatus illustrated in Figs. 1 and 2. Fig. 5 is a side elevation of the pressure-board illustrated in Fig. 4. Fig. 6 is a central longitudinal section of the middle portion of a pressure-board of different construction from that represented in the other views, the parts being drawn to a larger scale than in the other views. Fig. 7 is a top plan view of a part of the pressure-board constructed like that indicated in Fig. 6, the top of the pressure-board being removed. Fig. 8 is a sectional view taken on the line 8 of Fig. 7. Fig. 9 is a longitudinal sectional view of part of the pressure-board of still different construction, the side wall of the pressure-board being broken away to show the operating mechanism of one of the dough-engaging blades.

In the accompanying drawings, A represents the framework of the machine, B the endless belt which operates to advance the dough masses through the apparatus, and C the turning roller at the head end of the machine around which the belt passes. The belt-roller is driven in any suitable way and imparts motion to the belt and other parts of the apparatus. It is provided upon one end with a sprocket or belt wheel D, with which a sprocket-chain or belt E engages. The sprocket-chain engages with and drives an idler-wheel F, suitably mounted in the framework of the machine, a wheel F' on the feed-roller G, a wheel F² on the axis of the device for sheeting the dough preparatory to its being curled, and with a wheel F³, mounted on a shaft H.

I represents the hopper, into which the masses of dough after they have been weighed and are of proper size but of irregular shape are placed and whence they pass to the operating parts of the molding-machine.

I' represents a flour-box, the bottom of which is formed by the smooth-surfaced roller G, which roller is arranged just above the traveling belt B and slightly in advance of the lower opening end of the feed-hopper I. The roller serves both to feed the dough masses forward from the hopper onto the driving-belt and also delivers upon the surface of the dough mass a small quantity of loose flour to prevent it sticking to parts of the apparatus with which it subsequently comes in engagement.

Immediately in advance of the roller G and the flour-box is the device for sheeting or flattening out the dough masses, and thus preparing them for being curled and subsequently formed into a loaf. This part is represented as a whole by the letter J.

K represents the curler, which may be of any of the approved constructions, such as shown in our former patents.

In our aforesaid patent of May 15, 1900, we showed an apparatus for sheeting dough which consisted of means arranged to move toward and from the mass of dough rapidly, whereby the dough is acted upon intermittently or interruptedly. The device we there showed was of a reciprocating nature, consisting of a bar or bars which were reciprocated rapidly and engaging with the dough as it was moved by the feeding-belt flattened it out. Our present improvement in the means for sheeting the dough is of a nature similar to that covered by our said patent, in so far as we employ means in the nature of small rods or bars which move toward and from the path of the dough and acting thereon intermittently or interruptedly flatten it out into a sort of sheet. Our invention, however, is an improvement, in that we construct the dough sheeting or flattening devices so that it may have in operation a rotary motion instead of a reciprocating movement. The advantages incident to this improvement will be evident, consisting of the capability of greater speed with the requirement of less power to drive it and with less wear upon the machine as a whole.

The dough sheeting or flattening device which we have invented consists of a set of rods or bars arranged in a circle around the axis about which the device turns in operation. The preferred form of the device consists of a pair of heads $j$, in which are mounted a series of transverse bars or rods $j'$, disposed in a circle about the axis of rotation of the sheeting or flattening device. The device which we have thus described is not unlike in appearance the revolving cylinder frequently found in squirrel-cages. It is suitably mounted in the frame of the machine, there being a central axis $j^2$ extending between and connecting the heads $j$, or instead the heads may be provided with stub-axles or trunnions which afford suitable means for mounting the device in the framework of the machine. The wheel $F^2$ is mounted upon the shaft or axle of the sheeting device and gives motion to it in the proper direction at the required speed.

We prefer to cover the rods or bars $j'$ with some soft yielding material, such as sheepskin, and this covering is represented at $j^3$. We find that when thus covered there is less tendency on the part of the dough to stick to the transverse bars of the device than when they are left naked, and while the dough is more efficiently sheeted or flattened out at the same time it has less of the gas worked out of its skin or surface portion.

It sometimes happens that a dough mass will tend to follow the upward-moving bars of the sheeting device after it has passed under the latter instead of remaining upon the feeding-belt B. In order to prevent this and to force any dough mass which might cling to the bars of the dough-flattening device back upon the belt B, we employ a rapidly-rotating roller L, arranged close to the sheeting device and directly above the belt B at the place where the dough should leave the sheeting device and pass to the curler. The roller L may be either smooth or slightly roughened and driven at a comparatively high speed—that is, with a surface speed greater than the speed of the bars of the sheeting device as they travel around. The end of the roller L is provided with or formed into a gear-pinion $l$, with which engages a gear-wheel $l'$ on the shaft H.

M represents a pivoted plate or shield arranged between the roller L and the curler K. Its free edge is preferably held by a spring in engagement with the surface of the roller L, so that it acts to keep the latter clean. It also serves to direct the dough to the curler, preventing it from rising and passing over the curler from any cause whatever. After the dough has passed the curler and has been operated upon thereby in a manner fully described in our aforesaid patents it passes to the pressure-board, and by the conjoint action of this part of the apparatus and the traveling belt B the dough mass is formed into a properly shaped and compacted loaf.

We have hereinbefore intimated that it was not desirable to unduly work the skin or surface portion of the dough during the operation of forming it into a loaf. With this in view we have devised a novel form of pressure-board which while operating in conjunction with the means for advancing the dough mass to form the dough mass into a compact and homogeneous loaf reduces to a minimum the engagement or contact of the pressure-board with the dough. A simple form of this feature of our invention is illustrated in Figs. 4 and 5, where the operating-surface instead of being continuous longitudinally from end to end of the board consists of a number of intermittently successively operating narrow dough-engaging surfaces or edges. Referring to the drawings, N represents the pressure-board as a whole. $n\ n$ represent the sides or depending edges and $n'$ the top of the board. O O represent a series of plates or blades projecting downward into the passage-way formed between the top $n'$ of the pressure-board, the traveling belt B, and the sides $n$ of the pressure-board, within which passage-way the dough loaf is formed. These plates or blades are movable, being mounted upon shafts $o$, which are free to turn in their bearings, and are provided with weights $p$, so disposed that the blades normally occupy the position shown in full lines in Fig. 4 and in dotted lines in Fig. 5—that is to say, inclined, with their dough-engaging edges projecting toward the head end of the machine and in position to engage with a mass of dough, which may be advanced by the belt B. These plates or blades being free to swing under the action of the advancing mass of dough move through the arc indicated by dotted lines at the right-hand end of Fig. 4 during the act of operating upon a dough mass. The successive engagements of the plates or blades O with the dough mass moving through the passage-way cause the mass to be rolled together and compacted, each plate as it engages with the mass operating to tuck in toward the center of the forming loaf the portion with which it engages. As soon as the dough mass passes onward beyond any plate the latter is restored to its normal position by its weight $p$. In this form of our invention we prefer that the top of the pressure-board should be stepped, as indicated at $n^2$, the lowest portion of the board being toward the head or feed end of the machine, and that the plates or blades O should be successively longer from the feed end of the pressure-board for a distance about one-third of the way to the delivery end, whence they are all of a length. Only one of these longest plates or blades is indicated in the drawings, as the middle portion of the board is broken away. The delivery end of the pressure-board is provided with a substantially flat working face. This may be flat and continuously faced like the surface of the pressure-boards indicated in our earlier patents; but we prefer that it should be in the form of a grid, as indicated at Q, as such a construction preserves the feature of a pressure-board having a surface which acts upon the dough loaf intermittently or interruptedly. This flat or horizontally-working surface of the pressure-board is pivoted at its forward end, as indicated at $q$, while its rear end is drawn downward by a relatively weak spring R. A stop R' prevents the part Q of the pressure-board from passing below the position indicated in dotted lines in Fig. 4. When a dough mass is passing this portion Q of the pressure-board, it lifts this part to the position indicated in Fig. 5, the spring R operating to give the desired pressure to the dough loaf just before it emerges from the molding passage-way.

In the form of pressure-board provided with the separated and comparatively narrow dough-engaging surfaces formed by the swinging plates or blades which we have described the plates or blades are caused to operate upon the dough masses to form them into loaves solely by reason of the dough masses being carried through the molding-chamber by the means which advance them and because of the plates or blades being themselves held in proper position by the weights $p$. We have devised means to be combined with the successively-operating and narrow dough-engaging devices of the pressure-board, whereby such devices will be positively driven and caused to act upon the dough masses successively as the masses of dough pass through the molding passage-way, and we have also combined therewith means whereby the said dough-engaging devices are successively set in motion by the advancing masses of dough, so that the operation of these parts will be properly timed relative to the passage of each dough mass through the molding-chamber or passage-way.

Referring to Figs. 6 and 7, O' represents the series of separated narrow dough-engaging devices which operate to form the dough into a loaf while passing through the molding-chamber. These dough-engaging parts are secured to a series of shafts $o'$, mounted in the side walls of the pressure-board. Upon each shaft $o'$ there is loosely mounted a sprocket-wheel S, arranged, preferably, outside of and close to one side wall or flange $n$ of the pressure-board. A sprocket-chain $s$, engaging with a sprocket-wheel on any suitable driven shaft at the head end of the apparatus, engages with the series of sprocket-wheels S and drives them. There is a connecting or clutch mechanism interposed between each sprocket-wheel S and the shaft $o'$, upon which it is mounted, and the speed at which the sprocket-wheels S are driven is such that when connection is made between such wheels and the shafts, thereby moving the dough-engaging plates, blades, or similar devices, the latter will be moved somewhat faster than the belt B or other dough-advancing device moves. T represents a toothed wheel connected with the sprocket-wheel S and loosely mounted upon the shaft $o'$. It is provided on its periphery with teeth $t$, with which a toothed dog or connecting-lever U is adapted to engage. This dog or connecting-lever U is pivoted in the end of an arm V, secured fast to the shaft $o'$. It will be readily understood that by means of the construction described whenever the dog or lever U is moved so that its tooth $u$ comes into engagement with one of the teeth of the wheel T, which wheel is in constant motion, the lever or dog U, its supporting-arm V, and the shaft $o'$, to which the arm is secured, will be moved in the same direction as the wheel is moved, and such movement will cause the dough-engaging part O' to be moved in a direction and at a speed to effect a proper manipulation of the dough mass to form it into a loaf. There are connected with the lever or dog U means which are arranged to be operated by an advancing mass of dough to effect a movement of the lever or dog and cause a coupling or connecting of the shaft $o'$ and the driving mechanism S T thereof. One form of this trip or set-off mechanism consists of a plate W, preferably pivotally connected to the dough-engaging plate, bar, or blade O' and arranged normally to lie transversely across the molding-chamber and in the path of a mass of dough which may be carried by the belt through such chamber or passageway. The plate W is connected by a link X with the dog or lever U. Y represents a fixed cam which operates as a throw-off device to disengage the dog or lever U from the wheel T, and thus disconnect the shaft o' from its driving devices. A finger or inclined projecting end u' of the dog or lever U engages with the cam Y when the parts have been moved as far as it is desired they should, so that there is an automatic release of the shaft. A spring Z is connected with the shaft o' and tends to restore it to its normal position—that is to say, to the position indicated in Fig. 6.

The operation of the devices just described is as follows: A mass of dough enters the molding passage-way or chamber, having first been properly curled. As it is carried forward by the belt B it comes into engagement with the trip-plate W of the first dough-molding and loaf-forming device and moves this sufficiently to cause the dog U to engage with the wheel T. This connects the shaft o' with its driving or rotating mechanism and causes it to turn in the direction of the arrow in Fig. 6, moving the plate, blade, or bar O' into engagement with the dough, tucking the forward end of the dough mass inward and causing it to be rolled or folded together, as is required in making a dough loaf. The shaft and plate or blade O' move between a quarter and a half revolution before the finger u' of the dog or connecting-lever U comes into engagement with the cam Y or throw-off device, during all of which time the part O' is in engagement with the dough. When the dog or lever is disconnected, the dough mass has been so far advanced that it easily passes on beyond the part O', when this part, its shaft o', and the parts U V W X will be free to be restored to their normal position (indicated in Fig. 6) by the spring Z, ready to operate upon the next-following mass of dough in the manner just described.

In Fig. 9 we have represented another positively-driven dough-molding device possessing the characteristics of the dough-molding device just described. In this view, O'' represents the dough-engaging plates or blades which operate to tuck in and fold together, and thus form the dough masses into loaf shape. These dough-engaging parts are mounted upon shafts o'', suitably mounted in the sides of the pressure-board. Each shaft o'' has secured fast to it a mutilated wheel or gear-pinion S', which gear-wheels are adapted to be brought into engagement with a constantly-moving toothed driving-chain s', driven by any suitable part of the apparatus. The shafts o'' are bodily movable, so as to carry the gears S' into engagement with the chain s' and to move them out of engagement in a manner to be described. A spring Z'' tends to move the gear S' and the shaft to which it is secured away from the chain s' and hold them disengaged under normal conditions. Another spring Z' restores the plate or blade O'' to its normal position, ready to engage with the dough mass. W' represents a trip device. It consists of a transverse bar arranged within the dough-molding chamber or passageway and in the path of the dough masses which are passed through such chamber. It is connected by a link X' with a lever U', mounted in a suitable bearing V'. The lever U' bears upon the shaft o'', and when the trip is raised or moved by the advancing mass of dough the lever U' is so operated as to move the shaft o'' and cause its gear-wheel or pinion S' to engage with the drive-chain s', thereby causing the dough-engaging part O'' to be positively driven. The operation of this form of device is as follows: When a mass of dough enters the molding passage-way it first comes into engagement with one of the trip-bars W', and moving this operates the lower lever, so as to bring the gear-wheel S' into engagement with the drive-chain s'. This causes a partial revolution to be imparted to the shaft o'' and the plate or dough-engaging part O'' to move through an arc, (indicated by the dotted line in Fig. 9,) in performing which movement it will tuck in and fold together the dough mass, thereby doing its part in the formation of the loaf. When the dough-engaging part O'' has moved sufficiently far to complete its work, its motion is arrested by reason of the mutilated portion of the gear-wheel S' coming opposite to the drive-chain s'. As soon as the dough mass passes the dough-engaging plate or part the spring Z' restores it to its normal position, with its edge inclined toward the next advancing mass of dough, and at the same time the spring Z'' moves the shaft O'' to disengage the gear S' and the chain s'.

Having described our invention, what we claim, and desire to secure by Letters Patent, is—

1. The combination of means for advancing a dough mass, and a rotating device for flattening or sheeting such mass comprising a series of separated dough-engaging rods or bars, substantially as set forth.

2. The combination of means for advancing a dough mass, means for flattening or sheeting the dough mass comprising a series of separated transverse bars or rods arranged adjacent to the said advancing means and disposed in a circle, means for supporting such series of bars or rods, and means for rotating the same, substantially as set forth.

3. The combination with a dough-working machine, of means for flattening or sheeting the dough masses comprising a series of circularly-arranged separated rotating bars or rods, the said bars or rods being covered with a soft yielding material such as sheepskin, substantially as set forth.

4. The combination with rotating means for sheeting or flattening a mass of dough, and rotating means adjacent to such sheeting or flattening means arranged to remove any dough which may stick to the said sheeting or flattening means and prevent it being carried around thereby, substantially as set forth.

5. The combination of means for advancing a mass of dough, a rotating device for sheeting or flattening a dough mass arranged adjacent to the surfaces of the said dough-advancing means, and rotating means arranged adjacent to the rotating dough sheeting or flattening device arranged to prevent the dough from being carried around thereby, the direction of rotation of the said rotating means being such as to tend to force the particles or masses of dough which it may remove from the rotating sheeting or flattening device toward the surface of the advancing means, substantially as set forth.

6. In a dough-working machine, the combination of means for advancing dough masses, a dough sheeting or flattening device consisting of a series of separated rods or bars revolving about a common axis and a rotating shaft or roller L arranged close to the sheeting device, and arranged to prevent the dough masses from following the sheeting device as it moves away from the means for advancing the dough.

7. In a dough-working machine, the combination of means for advancing the dough masses, and means for sheeting or flattening them consisting of a series of separated bars or rods circularly disposed, a rotating roller L for preventing the dough from following the sheeting device as it moves away from the means for advancing the dough, a curler situated beyond the roller L, and a shield arranged between the said roller and the curler, substantially as set forth.

8. In a dough-working machine, the combination with means for advancing the dough masses, and a curler, of a pressure-board having its operating-surface which is arranged in advance of the curler, formed of successively-operating, narrow, pivoted, dough-engaging surfaces, substantially as set forth.

9. A pressure-board for a dough-working machine having its working face formed of a series of blades or plates the edges of which are adapted to operate upon the mass of dough being worked, there being spaces between such blades or plates, substantially as set forth.

10. A pressure-board for dough-working machines provided with a series of swinging plates or blades with their edges arranged to engage with the dough, substantially as set forth.

11. A pressure-board for a dough-working machine provided with swinging or pivoted plates or blades with their edges arranged to engage with the dough, and means for holding the said blades or plates inclined with their engaging edges toward the advancing dough masses, substantially as set forth.

12. A pressure-board for dough-working machines provided with a series of pivoted dough-engaging blades or plates, the same being successively longer, substantially as set forth.

13. A pressure-board for dough-working machines provided with a series of swinging or pivoted dough-engaging blades or plates, the pivots of the blades or plates being stepped, or successively farther from the base of the board, substantially as set forth.

14. A pressure-board for dough-working machines provided at its rear or feed end with a series of blades or plates having narrow, dough-engaging edges, and at its forward or delivery end being provided with a substantially flat or horizontal dough-working surface, substantially as set forth.

15. A pressure-board having a portion of its working surface in the form of a grid, substantially as set forth.

16. A pressure-board for a dough-working machine having a portion of its surface pivoted, and means for imparting a yielding pressure to said pivoted part, substantially as set forth.

17. A pressure-board for a dough-working machine, having its operating-face formed of successively-operating, narrow dough-engaging parts, combined with means for positively operating such dough-engaging parts in succession, substantially as set forth.

18. In a dough-working machine, the combination of a pressure-board having a series of separated, narrow dough-engaging parts, means for moving the dough relative to the pressure-board, means for positively driving the said narrow, dough-engaging parts of the pressure-board, and trip devices operated by the dough masses for setting into operation the said dough-engaging parts, substantially as set forth.

19. In a dough-working machine, the combination of a pressure-board, having a series of separated, narrow dough-engaging parts adapted to operate upon the dough masses to mold them into loaves, positively-driven means, loose relative to the said dough-engaging parts, for driving the latter, connecting or coupling devices arranged to unite the said driving devices and the dough-engaging parts, trip devices arranged to be operated by the advancing masses of dough to bring the said connecting or coupling devices into operation, and throw-off devices for disengaging the said connecting and coupling devices after the dough-engaging parts have operated, substantially as set forth.

20. In a dough-molding machine, the combination of means for advancing the dough masses, a pressure-board provided with a series of shafts $o'$ and a series of dough-engaging parts $O'$ connected with said shafts, continuously-operating driving devices for each of the said shafts loose relative thereto, connecting or coupling dogs or levers connected with the shafts and arranged to engage with the driving devices for the shafts, a series of trips W arranged in the path of the masses of dough as they are moved by the means which advance them, and connected with the connecting or coupling dogs or levers, throw-off means for disconnecting the said coupling devices when the parts have completed their operation, and means for restoring the parts to their normal position, substantially as set forth.

21. In a dough-working machine, the combination of means for advancing the dough masses, a series of dough-engaging plates or blades arranged adjacent to the dough-advancing means, the shafts upon which the said plates or blades are mounted, gearing for turning the shafts arranged normally to remain stationary, continuously-moving driving-gearing, means for connecting the said gearings whereby the latter drives the former and its connected shaft, trip mechanism operated by the dough masses for putting the said connecting devices into operation, and means for restoring the parts to their normal positions after the dough-engaging plates or blades have operated, substantially as set forth.

WILLIAM S. CORBY.
CHARLES I. CORBY.

Witnesses:
HERBERT A. WHITE,
JAMES B. DOBSON.